United States Patent [19]
Patterson, Jr.

[11] Patent Number: 4,867,394
[45] Date of Patent: Sep. 19, 1989

[54] COMPRESSION PYLON

[75] Inventor: James C. Patterson, Jr., Newport News, Va.

[73] Assignee: The United States of America as represented by the Administrator of the National Aeronautics and Space Administration, Washington, D.C.

[21] Appl. No.: 210,480

[22] Filed: Jun. 23, 1988

[51] Int. Cl.$^4$ .............................................. B64D 27/18
[52] U.S. Cl. ...................................... 244/54; 244/55; 244/130
[58] Field of Search ........................... 244/54, 55, 130

[56] References Cited

U.S. PATENT DOCUMENTS 3,519,227  7/1970  Brooks .
4,314,681  2/1982  Kutney .
4,410,150 10/1983  Lahti .
4,449,683  5/1984  Gratzer et al. .
4,489,905 12/1984  Bengelink et al. .
4,712,750 12/1987  Ridgwell .............................. 244/54

Primary Examiner—Galen L. Barefoot
Attorney, Agent, or Firm—George F. Helfrich; John R. Manning; Charles E. B. Glenn

[57] ABSTRACT

A "compression" pylon 10 for an aircraft with a wing-mounted engine, that does not cause supersonic airflow to occur within the fuselage-wing-pylon-nacelle channel 20. The chord length of the pylon 10 is greater than the local chord length of the wing 12 to which it is attached. The maximum thickness 45 of the pylon 10 occurs at a point corresponding to the local trailing edge 32 of the wing 12. As a result, the airflow through the channel 20 never reaches supersonic velocities.

4 Claims, 5 Drawing Sheets

FIG. 5 (1)

NACA 0012

FIG. 5 (2)

EMBODIMENT A

FIG. 5 (3)

EMBODIMENT B

COMPRESSION PYLON

ORIGIN OF THE INVENTION

The invention described herein was made by an employee of the United States Government and may be manufactured and used by or for the Government for governmental purposes without the payment of any royalties thereon or therefor.

FIELD OF THE INVENTION

The present invention relates to the field of aircraft engine pylons and more particularly to a compression pylon designed to reduce the interference drag associated with aircraft propulsion/airframe integration.

BACKGROUND OF THE INVENTION

The vast majority of transport aircraft employ pylons to attach turbofan or turboprop engines beneath the wing of the aircraft. A channel is formed by the side of the aircraft's fuselage, the under surface of the wing between the fuselage and the pylon, the inboard surface of the pylon, and the engine's nacelle. The aerodynamic shapes of the elements forming this channel greatly influence the airflow through it.

Due to structural considerations, a typical pylon has a chord length equal to the local chord length of the wing section to which it is attached with its maximum thickness occurring between 20 and 40 percent of the chord length of the pylon. To streamline the pylon, the cross-sectional area is progressively increased from the leading edge of the pylon to its thickest point in a curved fashion. This curvature is evenly distributed on each side of the pylon centerline. The cross-sectional area of the pylon is then progressively reduced toward the pylon trailing edge in a similar curved, symmetrical fashion.

The fuselage-wing-pylon-nacelle channel using the above described pylon causes a supersonic airflow phenomenon called wave drag, along with other aerodynamic problems, in a typical subsonic transport aircraft. The cross-sectional area of the channel decreases as the cross-sectional area of the pylon increases. The airflow through this channel accelerates until it reaches a velocity equal to the local speed of sound at the minimum cross-sectional channel area, at the maximum thickness position of the pylon. A normal shock wave occurs at this point. The flow velocity continues to increase past Mach 1 as the channel area increases due to the decrease in pylon thickness. This sonic and supersonic flow results in (1) loss of lift due to a decrease in static pressure under the wing, (2) an increase in form drag due to flow separation, and (3) wave drag due to the shock waves that are produced.

Past attempts to alleviate these unfavorable effects have not been totally successful. For example, one method is to flatten the inboard side of the pylon to reduce the local flow velocities. Unfortunately, since the pylon thickness must remain the same, the curvature on the outboard side must increase. This causes increased pylon flow separation and pylon drag.

Another method is to shape the pylon to conform to streamlines immediately adjacent to the pylon, as disclosed in U.S. Pat. No. 4,449,683 by Gratzer et al. The pylon has a less retarding effect on the span flow under the wing, so the induced drag of the airplane is increased over conventional pylons.

Yet another method is to modify a conventional pylon by either mounting a broad fairing on its inboard surface, or placing a tapered bump at the inboard intersection between the wing and pylon. Both embodiments are disclosed in U.S. Pat. No. 4,314,681 by Kutney. They effectively reduce the channel flow area, preventing supersonic airflow. However, the relatively crude addition of material to the pylon increases other forms of drag.

OBJECT OF THE INVENTION

It is the primary object of this invention to shape a pylon in such a way as to reduce the drag and loss of wing lift associated with supersonic airflow within the fuselage-wing-pylon-nacelle channel of an aircraft without creating additional drag associated with other areas of the pylon.

Other objects and advantages of the invention will become apparent hereinafter in the specification and drawings which follow.

SUMMARY OF THE INVENTION

According to the present invention, the foregoing and additional objects are obtained by providing a pylon that does not cause supersonic airflow to occur within the fuselage-wing-pylon-nacelle channel of an aircraft of the type having a wing-mounted turbofan or turboprop engine attached to a pylon beneath its wing. The chord length of the pylon is greater than the local chord length of the wing to which it is attached. The cross-sectional area of the pylon progressively increases longitudinally from its leading edge to the local trailing edge of the wing, with the inboard surface of the pylon increasing in distance from the centerline of the pylon. The maximum thickness of the pylon occurs at a point corresponding to the local trailing edge of the wing. The cross-sectional area of the pylon then decreases longitudinally from the local trailing edge of the wing to the trailing edge of the pylon.

DETAILED DESCRIPTION OF THE INVENTION

Figure 1:
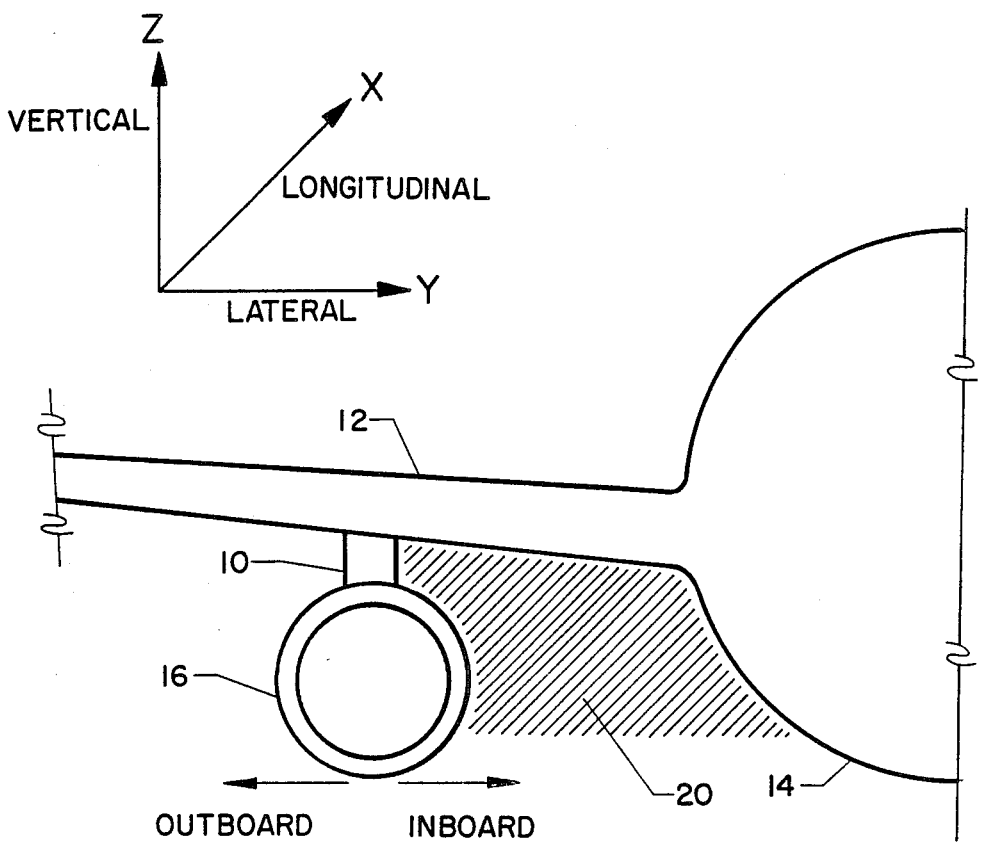
FIG. 1 is a perspective view of a wing-mounted turbofan engine showing a fuselage-wing-pylon-nacelle channel.

FIG. 1 shows generally a channel 20 formed by the fuselage 14, the under surface of the wing 12, the inboard surface of the pylon 10, and the engine nacelle 16 of a high-wing aircraft. FIG. 1 also shows the coordinate system of an aircraft, which will be used throughout this specification. As will be more fully described below, the air flowing longitudinally through the channel 20 during a typical transport aircraft flight can be kept subsonic if the airfoil shape of the pylon 10 is designed in accordance with the present invention.

Figure 2:
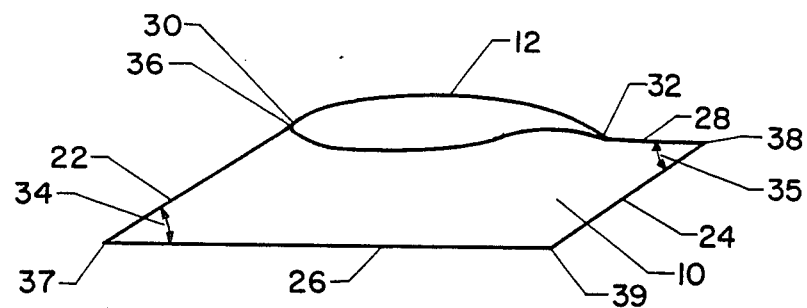
FIG. 2 is a side view of a pylon attached to the underside of a wing in accordance with the present invention.

Referring now to FIG. 2, a view in the x-z plane shows pylon 10 attached under wing 12 with the engine nacelle 16 removed. The pylon 10 has a leading edge 22 parallel to a trailing edge 24, and an engine attachment side 26 generally parallel to a wing attachment side 28. The highest point 36 of the pylon leading edge 22 is located at the wing leading edge 30, and extends forward to form an angle 34 with the engine attachment side 26 at the lowest point 37 of the pylon leading edge 22. The highest point 38 of the pylon trailing edge 24 is located aft of the wing trailing edge 32, with the pylon trailing edge 24 forming an angle 35, equal to angle 34, with the wing attachment side 28. The pylon trailing edge 24 meets the engine attachment side 26 at the lowest point of the pylon trailing edge 39. It should be noted that the above described shape of the pylon 10 is merely representative. With the exception that the highest point 38 of the pylon trailing edge 24 must be aft of the wing trailing edge 32, any conventional shape in the x-z plane will be adequate.

Figure 3:
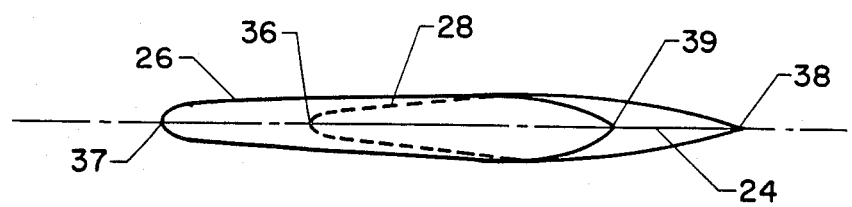
FIG. 3 is a bottom view of the pylon shown in FIG. 2.

Referring now to FIG. 3, a bottom view of the pylon 10 shows the general airfoil shape of the invention. Unlike the shape of the pylon 10 in the x-z plane, the shape of the pylon 10 in this x-y plane, hereinafter called the airfoil shape, is critical. The airfoil shape from the engine attachment side 26 vertically to the wing attachment side 28 generally remains constant.

Figure 4:
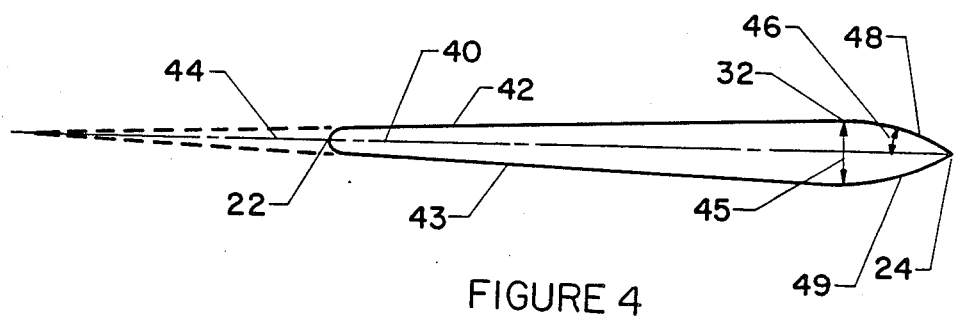
FIG. 4 is a two dimensional view of the airfoil shape of the pylon shown in FIG. 2.

Referring now to FIG. 4, a two dimensional view of the airfoil shape of the pylon 10 is shown, and will be described along the wing attachment side 28. The distance between the pylon leading edge 22 and pylon trailing edge 24 is defined as the pylon chord length, and is greater than the wing chord length. With the exception of the rounded pylon leading edge 22, the two forward sides 42 and 43 progressively and symmetrically increase in distance from the centerline 40 at a divergence angle 44 starting at the pylon leading edge 22. When the maximum thickness 45 is reached at a point corresponding to the wing trailing edge 32, the two rearward sides 48 and 49 symmetrically decrease in distance from the centerline 40 at a closure angle 46, until the two rearward sides 48 and 49 meet at the pylon trailing edge 24. The values of the divergence angle 44, maximum thickness 45, and closure angle 46 can be varied to meet specific aircraft requirements. Some variation in the pylon leading edge 22 shape, pylon trailing edge 24 shape, and the shape of sides 42, 43, 48, and 49 can also be made and still be consistent with the present invention. The key aspect is that the maximum thickness 45 must occur aft of a point corresponding to the wing trailing edge 32.

The invention prevents supersonic airflow from occurring in the channel 20 during aircraft flight as follows. The minimum area of the channel 20 in the x-y plane occurs at a point along the x-axis where the maximum thickness 45 occurs in the pylon 10. Along the wing attachment side 28, this occurs at the wing trailing edge 32. The flow velocity within the channel 20 will increase above freestream velocity as the area within the channel 20 decreases. However, since the minimum area of the channel 20 occurs at the aft-most part of the channel 20, the flow velocity can only reach a maximum of Mach 1 within the channel. The flow does not return to ambient conditions until it is past the wing trailing edge 32. The pylon shape to the rear of the maximum thickness 45 is designed to assist the flow in its return to ambient conditions with minimum flow separation.

Figure 5:
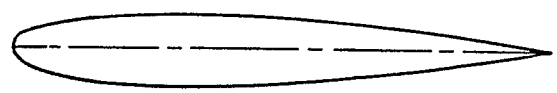
FIG. 5 shows and defines the airfoil shapes of one reference pylon and two pylons in accordance with the present invention.
Figure 5:
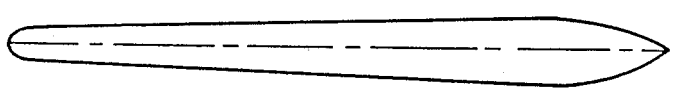
Figure 5:
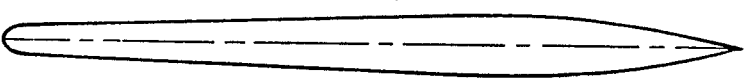

The benefits of the invention are apparent in test data. FIG. 5 shows three pylon airfoil shapes, 1, 2, and 3, and the corresponding chord length, maximum thickness 45, divergence angle 44, and closure angle 46 of each. Airfoil 1 represents a standard pylon design. Airfoils 2 and 3 are designed in accordance with the terms of the invention, and show two embodiments thereof.

Wind tunnel tests of the fuselage-wing-pylon-nacelle channel 20 were conducted with pylons having airfoil shapes 1, 2, and 3. The shape of the pylons in the x-z plane were as shown in FIG. 2, with a leading edge sweep angle 34 of 45°. The engine nacelle 16 was not installed.

Figure 6:
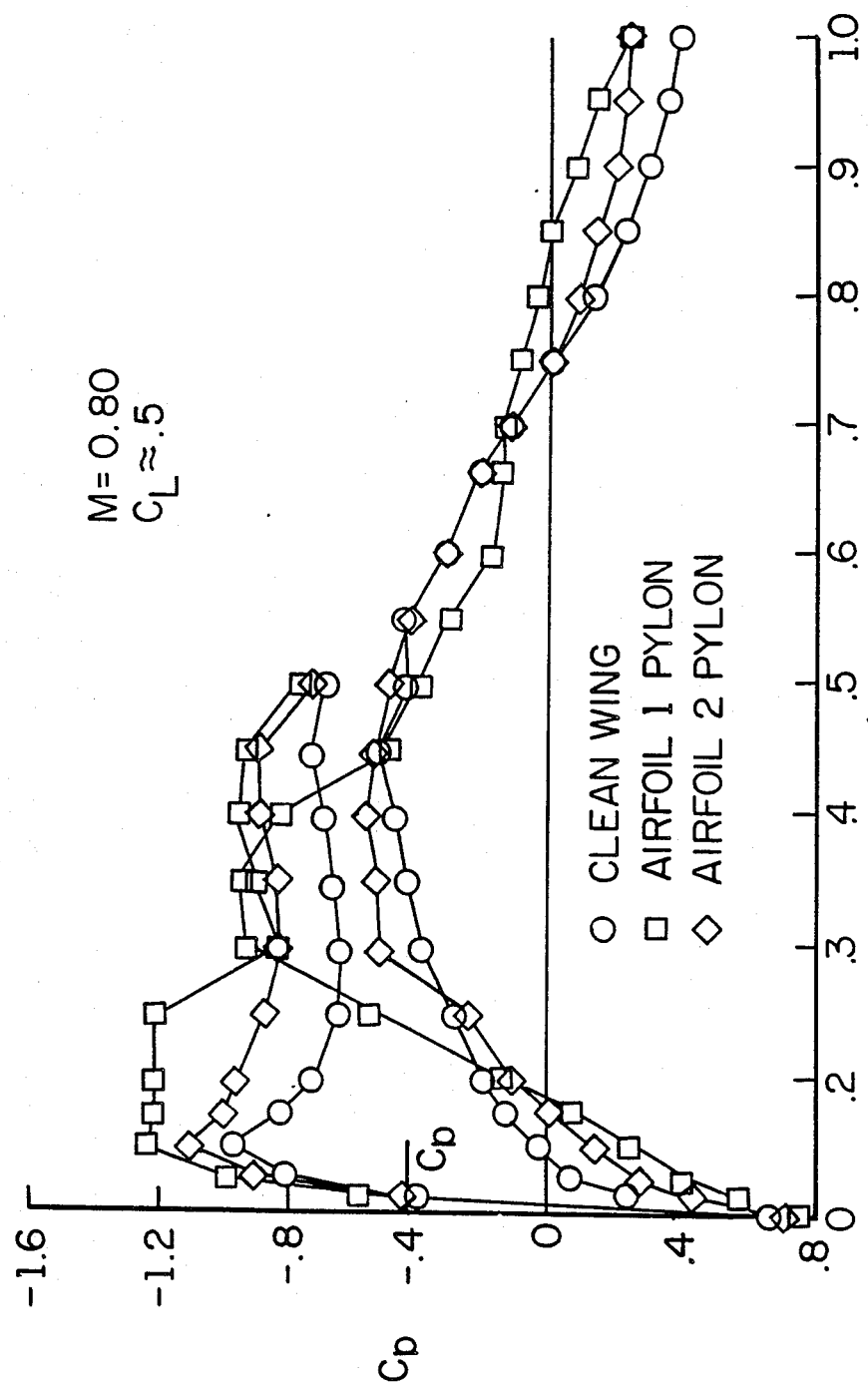
FIG. 6 is a line graph showing the effects of pylon airfoil shape on wing pressure coefficient distribution at Mach 0.8.

FIG. 6 shows the resulting distribution of pressure coefficient on both surfaces of a wing at Mach 0.8 without a pylon, with an airfoil 1 pylon, and with an airfoil 2 pylon. The airfoil 1 pylon is typical of a conventionally shaped pylon. To those skilled in the art of aeronautics, it is apparent that lower surface wing flow velocities are much greater between about 0.2 to 0.4 x/c using the airfoil 1 pylon as compared with a clean wing. Since the maximum thickness of the pylon occurs before the trailing edge of the wing, the flow becomes supersonic. In comparison, the airfoil 2 pylon did not show as great a velocity increase as the airfoil 1 pylon, being only slightly above that of the clean wing (no pylon installed).

Figure 7:
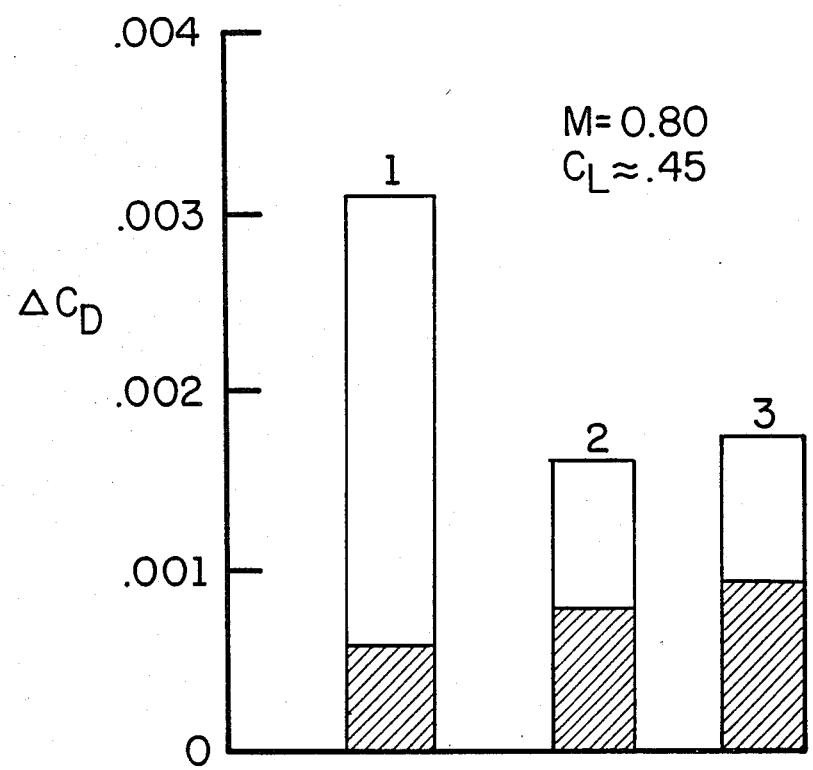
FIG. 7 is a bar graph showing the effect of pylon airfoil shape on aircraft drag.

The total airplane drag with pylons installed minus total airplane drag without pylons installed, viz., "installed drag", is presented in FIG. 7. The shaded area indicates skin friction drag of the pylons, and the unshaded area indicates the combined value of form, wave, and interference drag associated with the installation of the pylons. As can be seen, the airfoil 2 pylon and the airfoil 3 pylon have a lower installed drag as compared to the conventional airfoil 1 pylon. Although the airfoil 2 and 3 pylons have greater skin friction drag, this is more than compensated by the decrease in interference and wave drag. It is apparent from the different drag values associated with each embodiment that small changes in airfoil parameters can have a significant effect on the performance of the pylon. For any given aircraft, these parameters will have to be optimized to achieve maximum performance.

The decrease in interference and wave drag is a result of the prevention of supersonic flow in the channel 20 in accordance with the present invention. This has three effects: (1) wave drag is reduced, because at most very weak shock waves are formed; (2) drag due to flow separation is decreased because of lower flow velocities; and (3) loss in lift of the wing, usually associated with engine installation, is decreased, because the pressure loss associated with increasing velocities under the wing is decreased.

Although the present invention has been described in detail with respect to two preferred embodiments thereof, it should be recognized that numerous modifications, substitutions, and changes may be made to the compression pylon 10 without departing from the spirit of the invention, as defined in the hereto appended claims.

What is claimed as new and desired to be secured by Letters Patent of the United States is:

1. In combination with an aircraft of the type having a wing-mounted engine attached to a pylon beneath a wing, an improved pylon comprising:

a chord length greater than the local chord length of the wing in which said pylon is attached;

a cross-sectional area progressively increasing longitudinally from the leading edge of the pylon to the local trailing edge of said wing, with the inboard surface of said pylon symmetrically increasing in distance from the centerline of the pylon;

the maximum thickness of said pylon occurring at a point corresponding to the local trailing edge of said wing; and a cross-sectional area decreasing longitudinally from the local trailing edge of the wing to the trailing edge of the pylon.

2. The improved pylon of claim 1 wherein said inboard surface of said pylon and the outboard surface of said pylon are symmetrical about said centerline of said pylon.

3. The improved pylon of claim 2 wherein said pylon has a chord length of 1.25 times that of said wing, a maximum thickness of 12% of said pylon chord length, a divergence angle of 2.4 degrees, and closure angle of 19.5 degrees.

4. The improved pylon of claim 2 wherein said pylon has a chord length of 1.5 times that of said wing, a maximum thickness of 12% of said pylon chord length, a divergence angle of 2.4 degrees, and a closure angle of 10.0 degrees.

* * * * *